(12) United States Patent
Bacher et al.

(10) Patent No.: US 8,683,264 B2
(45) Date of Patent: Mar. 25, 2014

(54) PROCESSING EXECUTION REQUESTS WITHIN DIFFERENT COMPUTING ENVIRONMENTS

(75) Inventors: Utz Bacher, Weil im Schoenbuch (DE); Hai Huang, White Plains, NY (US); Brian Peterson, Ridgefield, CT (US); Stefan Raspl, Bondorf (DE)

(73) Assignee: International Business Machines Corporation, Armonk, NY (US)

( * ) Notice: Subject to any disclaimer, the term of this patent is extended or adjusted under 35 U.S.C. 154(b) by 296 days.

(21) Appl. No.: 13/080,773

(22) Filed: Apr. 6, 2011

(65) Prior Publication Data

US 2011/0252279 A1 Oct. 13, 2011

(30) Foreign Application Priority Data

Apr. 13, 2010 (EP) .................................. 10159705

(51) Int. Cl.
*G06F 11/00* (2006.01)
(52) U.S. Cl.
USPC ............................................................ 714/25
(58) Field of Classification Search
USPC ............................................ 714/11, 38.1, 25
See application file for complete search history.

(56) References Cited

U.S. PATENT DOCUMENTS

| | | | |
|---|---|---|---|
| 5,951,697 A | | 9/1999 | O'Donnell et al. |
| 6,058,493 A * | | 5/2000 | Talley ............................ 714/38.1 |
| 6,247,148 B1 * | | 6/2001 | Annicchiarico et al. ......... 714/45 |
| 7,020,722 B2 | | 3/2006 | Sivier et al. |
| 7,082,553 B1 * | | 7/2006 | Wang ........................ 714/38.13 |
| 7,370,101 B1 | | 5/2008 | Lakkapragada et al. |
| 7,647,539 B2 | | 1/2010 | Bussa et al. |
| 8,037,350 B1 * | | 10/2011 | Aggarwal et al. ................ 714/11 |
| 8,069,352 B2 * | | 11/2011 | Sturges et al. ................. 713/178 |
| 8,209,288 B2 * | | 6/2012 | Friedman et al. ............. 707/638 |
| 2002/0188873 A1 * | | 12/2002 | Berglund et al. ............. 713/300 |
| 2004/0003332 A1 * | | 1/2004 | Kim et al. ...................... 714/744 |
| 2005/0204343 A1 * | | 9/2005 | Kisamore et al. ............. 717/124 |
| 2009/0300423 A1 | | 12/2009 | Ferris |
| 2011/0066779 A1 * | | 3/2011 | Bogenberger et al. ........ 710/107 |

FOREIGN PATENT DOCUMENTS

EP 1599012 A1 11/2005

OTHER PUBLICATIONS

"Faster Application Migration via Automated Post-migration Testing," http://priorartdatabase.com/IPCOM/000184254/, Jan. 25, 2010.
"Migration Testing," http://www.valiancepartners.com/methodology-testing.php, Jan. 25, 2010.
"Six Steps to Migration Project Success," http://www/syntelinc.com/uploadedFiles/Syntel_Migraton_6Steps.pdf, Jan. 25, 2010.

(Continued)

*Primary Examiner* — Yair Leibovich
(74) *Attorney, Agent, or Firm* — Steven Chiu, Esq.; Matthew M. Hulihan, Esq.; Heslin Rothenberg Farley & Mesiti P.C.

(57) ABSTRACT

A computerized method, computer system, and a computer program product for processing an execution request within different computing environments. Execution requests and generated reference information are forwarded to the different computing environments, where the requests are processed using the reference information. Results of the processed execution requests are collected from the different computing environments. The results are compared to find any discrepancy, possibly giving indication of a software or hardware error.

22 Claims, 3 Drawing Sheets

(56) References Cited

OTHER PUBLICATIONS

Tonella, Paolo et al., "A 2-Layer Model for the White-Box Testing of Web Applications," Proceedings of the Sixth IEEE International Workshop on Web Site Evolution (WSE'04), Sep. 11, 2004, pp. 11-19.

Wang, Di et al., "Regression Testing of Composite Service: An XBFG-based Approach," 2008 IEEE Congress on Services Part II, pp. 112-119, Dec. 8, 2008.

Ding, Xiaoning et al., "Splitter: A Proxy-based Approach for Post-Migration Testing of Web Applications," In Proc. of the ACM SIGOPS/EuroSys European Conference on Computer Systems (EUROSYS 2010), Paris, France, Apr. 13-16, 2010.

Murray, Paul T., "Somersault: Enabling Fault-Tolerant Distributed Software Systems," Hewlett-Packard Laboratories, Sep. 1998.

\* cited by examiner

PROCESSING EXECUTION REQUESTS WITHIN DIFFERENT COMPUTING ENVIRONMENTS

PRIOR FOREIGN APPLICATION

This application claims priority from European patent application number 10159705.2, filed Apr. 13, 2010, which is hereby incorporated herein by reference in its entirety.

BACKGROUND

One or more aspects of the present invention relate to a computerized method for processing an execution request within different computing environments, a computer system for processing the computerized method, and a computer program product containing code portions to process the computerized method.

Data integrity is pivotal to the usefulness of any data processing system. It ensures that the data is free from any modification during transmission to or from storage devices and throughout its existence on the storage media. In the case of silent data corruption, data errors go undetected and unreported to the system and are not communicated to the software application.

Software or hardware errors may also corrupt data. Some of these errors only occur rarely or only in specific computing environments, for example, in a specific hardware or operating system. These sporadic errors may also be hard to detect.

A popular approach to detect such occurrences of silent data corruption or errors in software or hardware is to perform the same software operations on different computer systems and compare the results. This is usually achieved by testing the software to be analyzed within different computing environments. The results of the tests are compared to see if they are identical.

Consider that a computer system has multiple nodes, that is, separate computing environments, for parallel processing. A splitter component receives an original request and forwards it to the nodes. After processing the forwarded requests, each node sends back its result to the splitter component. The splitter component collects and compares the results to verify that they are identical.

However, such an approach has limited applicability for actual software systems, for example, web servers. In this case, a comparison of the results of the run of a software application to be analyzed on different systems must take into account non-deterministic elements.

BRIEF SUMMARY

In accordance with an aspect of the invention, a computerized method for processing an execution request within different computing environments is provided. The method includes, for instance, the following. Reference information is generated to be used by the different computing environments when processing the execution request. This generated reference information and the execution request are forwarded to the different computing environments. The execution request is processed within the different computing environments using the forwarded reference information. The results of the processed execution request are collected from the different computing environments to be compared for finding a discrepancy giving indication of a software or hardware error.

In a further aspect of the present invention, there is provided a computer system for processing an execution request within different computing environments. The system includes data processing means and storage means. The data processing means generate reference information to be used by the different computing environments when processing the execution request. The data processing means forward the generated reference information and the execution request to the different computing environments. The data processing means process the execution request within the different computing environments using the forwarded reference information. The data processing means collect results of the processed execution request from the different computing environments. The data processing means compare the collected results to find a discrepancy giving indication of a software or hardware error. The storage means store the generated reference information, the execution request and the results of such processed execution request.

According to a yet further aspect of the present invention, a computer program product is provided for processing an execution request within different computing environments. The computer program product includes a computer usable medium having computer usable program code embodied therewith. The computer usable program code is configured to perform, for instance, the following. Reference information is generated to be used by the different computing environments when processing the execution request. This generated reference information and the execution request are forwarded to the different computing environments. The execution request is processed within the different computing environments using the forwarded reference information. Results of the processed execution request are collected from the different computing environments to be compared for finding a discrepancy giving indication of a software or hardware error.

BRIEF DESCRIPTION OF THE SEVERAL VIEWS OF THE DRAWINGS

For better understanding of one or more aspects of the present invention and as how the invention may be carried into effect, reference will now be made by way of example only to the accompanying drawings in which.

DETAILED DESCRIPTION

Figure 1:
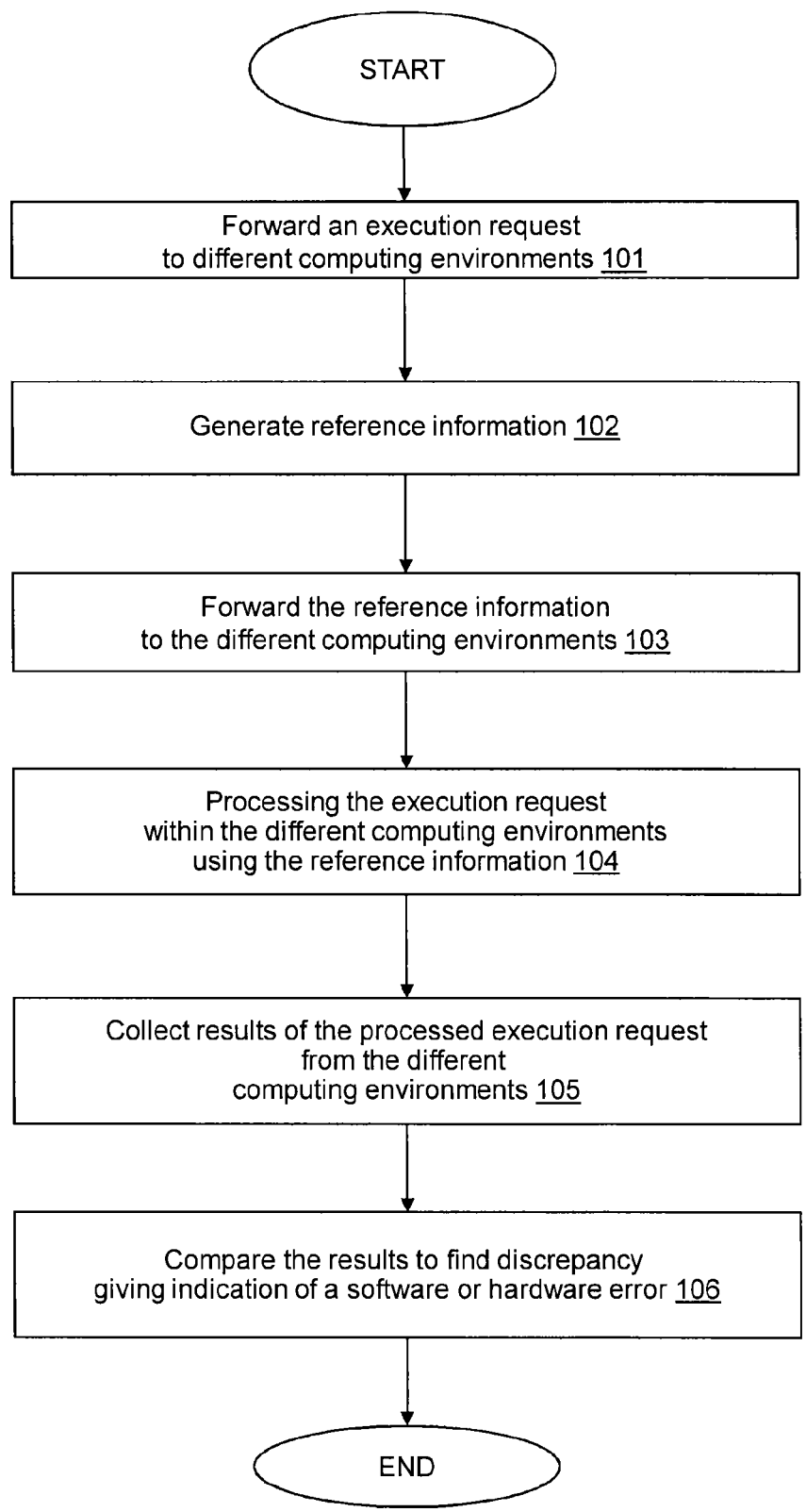
FIG. 1 illustrates a flow chart of a computerized method for processing an execution request according to an embodiment of the present invention.

A computer system has multiple processing nodes providing different computing environments. The nodes may be realized as physical or virtual nodes, for example, as separate hardware hosts, virtualized systems on one host, or mixtures thereof. On each node, a corresponding operating system is running. The computing environments may be different in one or several of hardware, operating system and software. Even if both the hardware and the operating system versions are identical, the computing environments may still be different regarding the work load of multiple processes, their scheduling, the communication with external devices, and the system states. The order of processing steps may then differ from one computing environment to another while running the software application. These differences may be responsible for non-deterministic effects (e.g., non-deterministic errors).

Consider the following examples of different computing environments: two nodes have different operating systems, for example, IBM AIX on IBM System p and Linux on IBM System z. Other examples for different operating systems are Red Hat Enterprise Linux version 5 and Suse Linux Enterprise Server version 11, both on identical hardware IBM System z. Alternatively, the two nodes may have the same operating system, but different hardware, for example, x86 processors of Intel and AMD.

A migration of a software application from a source computing environment to a target computing environment copies code portions of the software application. Then, the functions of the migrated software application are to be carefully tested. To do this, an execution request that is sent to the target computing environment is to return the same response as the same request sent to the source computing environment.

An example of a software application is a web server. In response to HTTP requests, the web server provides web pages as HTTP responses. These web pages may include non-deterministic elements, such as current operating system times, random numbers, and computed results thereof.

Typically, an operating system determines its system time based on a hardware clock. The operating system time advances while a processor is running The measurement of execution time is not deterministic. For example, a timestamp may be recorded in the beginning or at the end of a processor operation. When data are transferred between the processor and external devices, for example, storage or network devices, there may be different time delays. In parallel processing environments, pre-emptive scheduling may execute instructions of parallel processes at different times.

Operating systems usually segregate virtual memory into kernel space and user space. Kernel space is strictly reserved for running the kernel, kernel extensions, and some device drivers. In contrast, user space is the memory area where all user mode applications work. In particular, Unix systems and their derivatives only have a few system calls to retrieve the operating system time. The operating system Linux exposes the system calls "gettimeofday( )" and "time( )" to the user space processes, which execute code portions of the software application.

Keys for encryption are typically created based on random numbers. Operating system designers go to great lengths to make sure that random numbers are really random, for example, by incorporating interrupts and the like in the random number generators. If two nodes use different hardware and operating system software, identical random numbers are impossible to achieve. Even in the case of identical hardware and operating system software, random numbers will likely differ. Comparing results becomes difficult.

Unix systems and their derivatives usually provide only a few mechanisms to get random numbers. For example, Linux has two special files, "/dev/random" and "/dev/urandom" that serve as a random number generator or as a pseudorandom number generator. The generation uses environmental noise collected from device drivers and other sources. An application can read a stream of random bytes from both files. The file "/dev/random" should be suitable for uses that need very high quality randomness, whereas "/dev/urandom" may be used for less secure applications.

These non-deterministic elements complicate a comparison of the HTTP responses from multiple nodes. A comparison tool may filter the parts of HTTP responses that are identified as non-deterministic, for example, because they include timestamp information. However, there are limitations to take this approach. The information of the results may be unstructured and the identification of the non-deterministic portions may become impossible. When the operating system time or the random numbers have an indirect effect on the result of a computation, the position of the non-deterministic information within the responses may vary with the type of computation or result, the external user, or other parameters. Hence, the non-deterministic portions of information cannot be easily excluded from comparison. Heuristics or manual intervention may be used to identify the parts of the responses that should not be compared, but have limited efficiency.

According to one embodiment, FIG. 1 illustrates a flow chart of a computerized method for processing an execution request of, for instance, a software application within different computing environments. The method includes the following steps, as an example: In block 101, an execution request is forwarded to different computing environments. In block 102, reference information is generated to be used by the different computing environments when processing the execution request. In block 103, the generated reference information is forwarded possibly by a splitter to the different computing environments. In block 104, the forwarded execution requests are processed within the different computing environments using the forwarded reference information. In block 105, results of the execution of the code portions of the software application are collected from the different computing environments. In block 106, the collected results are compared to find some discrepancy giving indication of a software or hardware error. Within the scope of an aspect of the present invention, it is possible to implement a method where steps 101 till 103 are applied in a different order.

Figure 2:
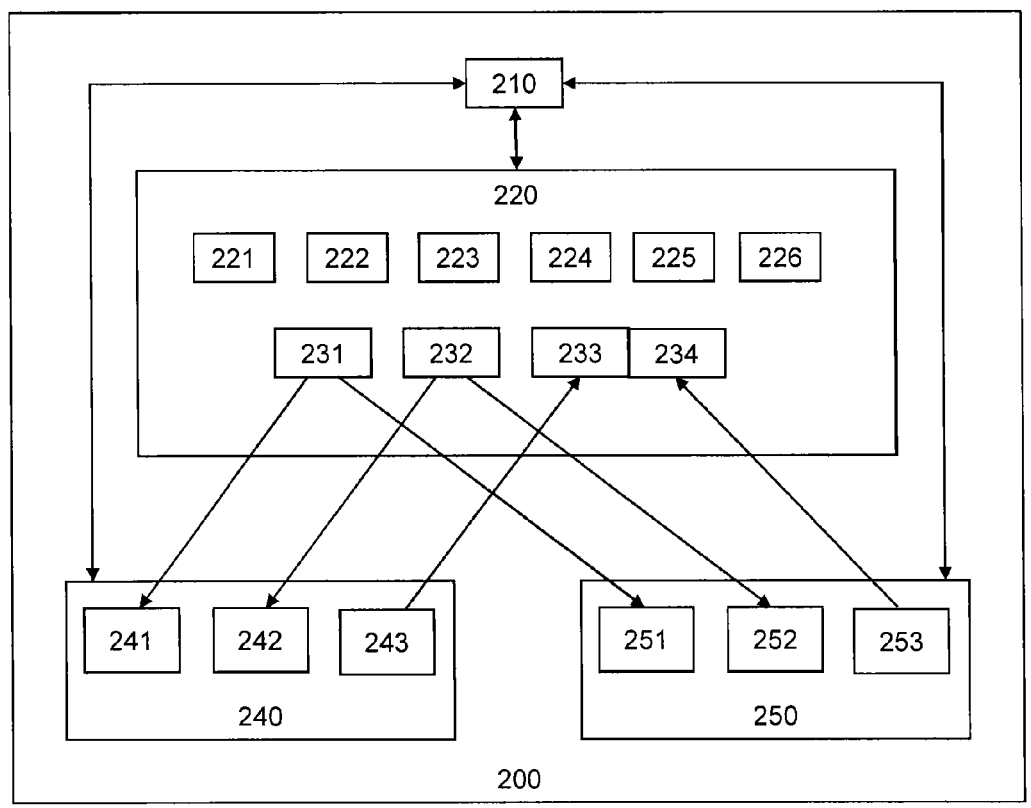
FIG. 2 illustrates a block diagram showing components of a computer system for processing an execution request according to an embodiment of the present invention.

FIG. 2 illustrates one example of a block diagram of a computer system 200 for processing execution requests within different computing environments, 240 and 250. The system can have more than two different computing environments. The system includes, for instance, data processing means 210 and storage means 220. The data processing means store program code portions, 221, . . . , 226, in respective elements of the storage means and execute these program code portions as follows, in one example: According to first program code portions 221, the data processing means forward the execution request 231 to the different computing environments 240 and 250. The blocks 241 and 251 represent the forwarded execution request. According to second program code portions 222, the data processing means generate reference information 232 to be used by the different computing environments when processing the execution request. According to third program code portions 223, the data processing means forward the generated reference information to the different computing environments. The blocks 242 and 252 represent the forwarded reference information. According to forth program code portions 224, the data processing means process the execution request within the different computing environments using the forwarded reference information. According to fifth program code portions 225, the data processing means collect results, 243 and 253, of the execution of the code portions of the software application from the different computing environments. According to sixth program code portions 226, the data processing means compare the collected results, 233 and 234, to find discrepancy possibly indicating a software or hardware error. The storage means store mainly the generated reference information, and the results of the execution including the comparison.

Figure 3:
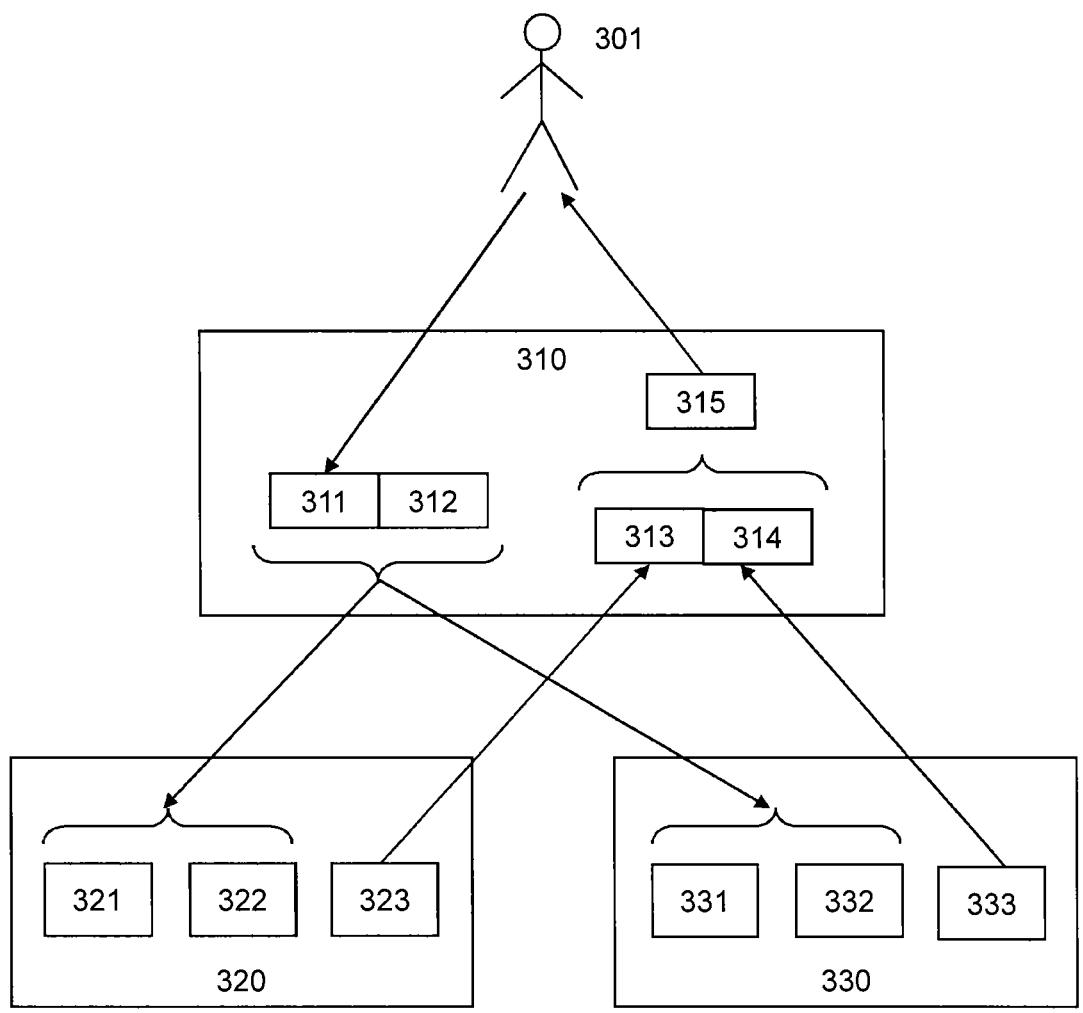
FIG. 3 illustrates a block diagram showing processing of external execution requests according to an embodiment of the present invention.

FIG. 3 illustrates a block diagram showing processing of external requests. A computer system has different computing environments 320 and 330. The system is not limited to two computing environments. Each of them stores forwarded execution requests, which are not displayed in FIG. 3. A splitter component 310 receives an execution request 311 from an external user 301 and attaches reference information 312 to the request. The splitter component duplicates the request together with the attached reference information to forward it to the different computing environments. The computing environments store the forwarded reference information 322 and 332 and execute the forwarded execution request 321 and 331, using the forwarded reference information. The splitter component collects the results 323 and 333, of the processed execution requests from the different computing environments. The splitter component compares the results, 313 and 314, and generates a response 315, which is sent back to the external user.

According to one embodiment of the present invention, it is proposed to adapt operating systems such that the system time as seen by an application can be controlled from outside the operating system. The operating system may expose dedicated system calls to set and store a reference timestamp, which is returned in response to a system call for the operating system time. When the splitter component receives an external request, it determines a reference timestamp and forwards the request together with the reference timestamp to the multiple nodes. Alternatively, the reference timestamp is provided by one of the nodes serving as a reference. While the nodes are processing the forwarded requests, user space processes issue system calls to the corresponding operating systems. The system calls, for example, "gettimeofday( )" and "time( )", are adapted to return the stored reference timestamp. Internally, the kernel may use the real current system time, for example, to handle timers or timing-based services. Computations on a node with such an adapted operating system only use the stored reference timestamp. After collecting the results of the computations from the nodes, the splitter component can compare the results more easily to verify that they are identical.

While processing a request within a computing environment, multiple system calls for the operating system time can occur, which all return the same stored reference value. When the software application determines time intervals within the request, the difference calculation has the result value of zero. This may cause problems in further calculations, for example, when the software application divides by this zero value. To circumvent these problems, a drifting mechanism may be applied. Subsequent system calls for the operating system time return monotonously increasing values. At each system call, the operating system time is incremented by only a small time difference, for example, 1 millisecond. This time difference may be dynamically adapted to the actual processing speed of the nodes.

It can happen that the time intervals between the reference timestamps are shorter or longer than the elapsed real time. In the first case, the time perceived by the user application slightly lags behind the real time. The timestamps associated with the requests would permit less real system time for execution, which may be less than the application really needs. In the second case, the perceived time advances ahead of the real time. In this case, time drifting methods, which are known from time service protocols, are to be employed to let the time perceived by the application fall back again behind the real system time.

Several requests may be passed to one or more nodes for processing in parallel. This means that the processing time of the requests is overlapping. In this case, drifting mechanisms can be employed to adjust the time intervals between subsequent reference timestamps and keep these time intervals roughly corresponding to the real time intervals. These drifting mechanisms have to consider different processing speeds of the nodes.

According to one embodiment of the present invention, it is further proposed to adapt operating systems such that the stream of random numbers provided by specific files, named pipes, or other interfaces, is fed from outside the operating system. Reference random numbers are generated outside the computing environments, for example, by the splitter component. Alternatively, a reference node may provide the random numbers. Each operating system may expose dedicated system calls, files, named pipes, or other interfaces to set and store the generated reference random numbers. While processing the forwarded requests, the corresponding user space processes may perform read operations on an operating system file to get a byte sequence of previously generated reference random numbers. Examples of such operating system files are "/dev/random" and "/dev/urandom". The forwarded requests that originate from one request use the same byte sequence of these generated reference random numbers. Examples for such computations are the creation of cryptographic keys, which may be used in http cookies. A cookie is a small piece of text stored on a user's computer by a web browser. After collecting the results of the computations from the nodes, the splitter component can compare the results more easily to verify that they are identical.

In an alternative embodiment, the operating system can provide an interface for random numbers, such as a specific system call. A local or remote random number manager pre-generates a list of key-value-pairs. The key is a request identifier and the value is a random number. The software application assigns a request identifier to each request and issues a system call for a random number. While processing the requests on the different computing environments, requests for the random number comprise the corresponding request identifiers. The random number manager returns the same random number in response to the same request identifier.

When the same forwarded requests are processed on two different nodes, the processing may be faster on one node than on another node. In one example, the generated reference information, such as timestamp or random numbers, is attached to the forwarded requests. Each node has a generic receiver component that receives the forwarded requests, detaches and stores the reference information in the corresponding operating system. This mechanism guarantees, in one example, identical reference information in the responses associated with the external request. All computations and their results are based on the identical reference timestamp and the identical random numbers. This leads to the conception "time per application", where the intervals between the discrete per-application timestamps are to be kept in-sync on all nodes. Subsequent calls from the application to the operating systems to read system time should continuously return reproducible increments of time, so that applications on both computer environments have the same notion of both time and duration. If the application performs time queries very often, it can happen that the notion of time as perceived by the application will be ahead of an external real clock time. Lowering the interval of the increments presented between two query operations will allow the time as perceived by the application to approach real clock time again. Similar techniques are known from time service protocols.

In an alternative embodiment, time could appear constant to the application and always return the time of the reference information associated with the request.

To increase throughput, multiple requests may be processed asynchronously. When the reference information is attached to the requests, the splitter component can send one request and does not have to wait for the response from at least one of the nodes before sending the next requests. The collection and comparison of the results from the nodes may be decoupled from forwarding the requests to the nodes. This decoupling allows resending the same request after a failure and processing it with the same reference information, e.g. to replay request processing in case of node outages.

In some cases, for example, when multiple write requests modify a common set of data, synchronous processing might be desired. The splitter component sends one request to one or more nodes and is to wait for the response from at least one of the nodes before sending the next request.

The splitter component may process the external requests in two modes: In a first mode, the splitter component waits for the responses from all nodes before comparing them and generating a response to the external user. Discrepancies from the comparison cause an immediate error. The external user is notified about the error and the current operation may be aborted. In a second mode, one node serves as a reference. When the splitter component receives a response from the reference node, it is immediately returned to the external user. The comparison of the results from the reference node and further test nodes may take place at a later point in time. Discrepancies are only recorded in a log, which an administrator may analyze later on.

To guarantee identical results from software applications running on the nodes, the number of system calls for the stored reference information should be equal on all nodes. This means that the software application is to have a deterministic/reproducible behavior. When a forwarded request reads random numbers at two different times, the software application is to serialize the two read operations.

A multi-tasking operating system may process multiple forwarded requests in parallel. Depending on the software application design, each forwarded request is handled by one or more corresponding operating system processes to execute some code portions of the software application. Each process is associated with only one of the forwarded requests. Typically, a process identifier is assigned for the operating system process. In the multi-tasking operating system, a scheduler successively loads the operating system processes into the processor. This load of another operating system process is also called context switch. When the node receives a forwarded request, the operating system stores the request identifier together with the attached reference information. Alternatively, the process identifier of the associated process can be stored instead of the request identifier. At every context switch, the operating system kernel checks if reference information has been stored for the process identifier or for the request identifier. Then, the kernel determines a piece of the stored reference information that matches the current process identifier or request identifier. When the current process issues a subsequent system call for reference information, this determined piece of stored reference information will be used.

By verifying the identity of the results of the requests on different computing environments, a number of application scenarios become possible: If one computing environment is a reference system known to produce correct results, an aspect of the invention can be used to test the other computing environments by checking if their results match up against the results produced by the reference system. This approach can also be used to detect silent data corruption in live production systems if different results from the computing environments are received. These instances can be detected to prevent further damage and documented for analysis. Furthermore, if logic is implemented to decide which result in case of different results to use, and if successive requests do not depend on previous results (or if other mechanisms are in place to make sure that the computing environments found to produce 'wrong' results can use the 'correct' result for future processing), this approach can be used to improve the overall system availability and reliability.

A simplified computerized method, computer system, and computer program product for processing an execution request within different computing environments are provided.

In an embodiment according to an aspect of the invention, the reference information includes a reference timestamp to be used for the operating system time of the different computing environment on which the execution request is processed.

In an alternative embodiment, the reference information includes randomness information, such as random numbers. It is possible to associate a request identifier with a request for a random number. In such a way, the same random number is provided in response to execution requests with the same request identifier to be processed within different computing environments.

In an alternative embodiment, the different computing environments are virtualized systems. In another alternative embodiment, the execution request is performed on similar code portions of a software application preinstalled at the different computing environments. In a further alternative, the computing environments are different in at least one of the following: hardware and operating system. In one embodiment, the computing environment has a corresponding operating system to store the reference information and return the stored reference information in response to requests launched during the processed execution request. The stored reference information is possibly updated in response to requests from outside the corresponding operating system.

In a further alternative embodiment, a splitter component receives and duplicates an external execution request to be forwarded to the different computing environments. The splitter component collects and compares the results, and in one example, sends back a response to the external request.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing has been with reference to particular embodiments of the invention, it will be appreciated by those skilled in the art that changes in these embodiments may be made without departing from the principles and spirit of the invention, the scope of which is defined by the appended claims.

What is claimed is:

1. A computerized method for processing an execution request within different computing environments, the method comprising:
generating reference information to be used by said different computing environments when processing said execution request, wherein said reference information comprises a reference timestamp;
forwarding said generated reference information and said execution request to said different computing environments;
executing said execution request within said different computing environments using said forwarded reference information, wherein the executing requests data for a non-deterministic element, the non-deterministic element for which data is requested comprising an operating system time of the computing environment executing the request, and wherein, based on the request for data for the non-deterministic element, at least some of the reference information is provided as the data for the non-deterministic element, wherein the reference timestamp is used for the operating system time of each of said different computing environments;
collecting results of the processed execution request from said different computing environments; and
comparing said collected results to identify whether a discrepancy exists giving indication of a software or hardware error, wherein provision of the at least some of the reference information as the data for the non-deterministic element facilitates comparison of the collected results to identify whether the discrepancy exists.

2. The method of claim 1, wherein said reference information comprises randomness information.

3. The method of claim 2, wherein the randomness information comprises one or more random numbers, and wherein a request identifier is associated with a request for a random number and a same random number is provided in the different computing environments in response to execution requests with the same request identifier.

4. The method of claim 1, wherein said different computing environments are virtualized systems.

5. The method of claim 1, wherein said execution request is performed on similar code portions of a software application preinstalled at said different computing environments.

6. The method of claim 1, wherein said computing environments are different in at least one of the following: hardware and operating system.

7. The method of claim 1, wherein each said computing environment has a corresponding operating system to store said reference information and return said stored reference information in response to requests launched during the processed execution request.

8. The method of claim 7, wherein said stored reference information is updated in response to requests from outside said corresponding operating system.

9. The method of claim 1, wherein a splitter component receives and duplicates an external execution request to be forwarded to said different computing environments, and the splitter component collects and compares said results, and sends back a response to said external request.

10. The method of claim 1, wherein the request for data for the non-deterministic element comprises invoking a system call, and wherein information provided in response to the system call comprises the at least some reference information.

11. The method of claim 1, wherein at least one computing environment of the different computing environments comprises a system in live production, and wherein the method facilitates identification of silent data corruption in the system in live production.

12. A computer system for processing an execution request within different computing environments, the computer system comprising:
a memory; and
a physical processor in communications with the memory, wherein the computer system is configured to perform a method, said method comprising:
generating reference information to be used by said different computing environments when processing said execution request, wherein said reference information comprises a reference timestamp;
forwarding said generated reference information and said execution request to said different computing environments;
executing said execution request within said different computing environments using said forwarded reference information, wherein the executing requests data for a non-deterministic element, the non-deterministic element for which data is requested comprising an operating system time of the computing environment executing the request, and wherein, based on the request for data for the non-deterministic element, at least some of the reference information is provided as the data for the non-deterministic element, wherein the reference timestamp is used for the operating system time of each of said different computing environments;

collecting results of the processed execution request from said different computing environments; and comparing said collected results to identify whether a discrepancy exists giving indication of a software or hardware error, wherein provision of the at least some of the reference information as the data for the non-deterministic element facilitates comparison of the collected results to identify whether the discrepancy exists.

13. The computer system of claim 12, wherein said execution request is performed on similar code portions of a software application preinstalled at said different computing environments.

14. The computer system of claim 12, wherein each said computing environment has a corresponding operating system to store said reference information and return said stored reference information in response to requests launched during the processed execution request, and wherein said stored reference information is updated in response to requests from outside said corresponding operating system.

15. The computer system of claim 12, wherein the request for data for the non-deterministic element comprises invoking a system call, and wherein information provided in response to the system call comprises the at least some reference information.

16. A computer program product for processing an execution request within different computing environments, the computer program product comprising:

a non-transitory computer readable storage medium readable by processor and storing instructions for execution by the processor for performing a method comprising:

generating reference information to be used by said different computing environments when processing said execution request, wherein said reference information comprises a reference timestamp;

forwarding said generated reference information and said execution request to said different computing environments;

executing said execution request within said different computing environments using said forwarded reference information, wherein the executing requests data for a non-deterministic element, the non-deterministic element for which data is requested comprising an operating system time of the computing environment executing the request, and wherein, based on the request for data for the non-deterministic element, at least some of the reference information is provided as the data for the non-deterministic element, wherein the reference timestamp is used for the operating system time of each of said different computing environments;

collecting results of the processed execution request from said different computing environments; and comparing said collected results to identify whether a discrepancy exists giving indication of a software or hardware error, wherein provision of the at least some of the reference information as the data for the non-deterministic element facilitates comparison of the collected results to identify whether the discrepancy exists.

17. The computer program product of claim 16, wherein said reference information comprises randomness information.

18. The computer program product of claim 17, wherein the randomness information comprises one or more random numbers, and wherein a request identifier is associated with a request for a random number and a same random number is provided in the different computing environments in response to execution requests with the same request identifier.

19. The computer program product of claim 16, wherein said execution request is performed on similar code portions of a software application preinstalled at said different computing environments.

20. The computer program product of claim 16, wherein each said computing environment has a corresponding operating system to store said reference information and return said stored reference information in response to requests launched during the processed execution request, and wherein said stored reference information is updated in response to requests from outside said corresponding operating system.

21. The computer program product of claim 16, wherein a splitter component receives and duplicates an external execution request to be forwarded to said different computing environments, and the splitter component collects and compares said results, and sends back a response to said external request.

22. The computer program product of claim 16, wherein the request for data for the non-deterministic element comprises a system call, and wherein information provided in response to the system call comprises the at least some reference information.

* * * * *